United States Patent [19]

Schingnitz et al.

[11] Patent Number: 5,550,312
[45] Date of Patent: Aug. 27, 1996

[54] METHOD OF THERMAL UTILIZATION OF WASTE MATERIALS

[75] Inventors: Manfred Schingnitz; Peter Göhler, both of Freiberg; Heinz Martin, Rostock, all of Germany

[73] Assignee: Noell-DBI Energie-Und Entsorgungstechnik GmbH, Freiberg, Germany

[21] Appl. No.: 384,696

[22] Filed: Feb. 6, 1995

Related U.S. Application Data

[63] Continuation of Ser. No. 983,980, Nov. 30, 1992, abandoned.

[30] Foreign Application Priority Data

Nov. 29, 1991 [DE] Germany .......................... 41 39 512.3
Jun. 19, 1992 [DE] Germany .......................... 42 20 055.5

[51] Int. Cl.$^6$ .............................. B09B 3/00; A62D 3/00; C22B 7/00; C02F 1/00
[52] U.S. Cl. .......................... 588/205; 588/206; 588/207; 588/208; 588/230; 588/231; 423/650; 423/DIG. 18; 423/418.2; 252/373; 48/197 FM
[58] Field of Search ....................... 588/204, 205, 588/206, 207, 208, 209, 210, 230, 231, 232; 201/25; 423/DIG. 18, 650, 418.2; 252/373; 48/197 FM

[56] References Cited

U.S. PATENT DOCUMENTS 1,818,912  8/1931  Trent ............................ 201/25
4,343,626  8/1982  Peise et al. ................... 48/67
4,421,524  12/1983 Chattick ....................... 201/25
4,658,736  4/1987  Walter ......................... 110/346
4,793,855  12/1988 Hauk ........................... 75/26
4,878,440  11/1989 Tratz et al. .
5,376,354  12/1994 Fischer et al. ................ 423/659

FOREIGN PATENT DOCUMENTS 3011157    1/1981  Germany .
3811820A1  2/1989  Germany .......................... C01J 3/64
4123406    1/1993  Germany .
1398858    6/1975  United Kingdom .
2110231    3/1982  United Kingdom .
WO90/02162 3/1990  WIPO .
WO93/02162 2/1993  WIPO .

*Primary Examiner*—Gary P. Straub
*Assistant Examiner*—Timothy C. Vanoy
*Attorney, Agent, or Firm*—Cohen, Pontani, lieberman, Pavane

[57] ABSTRACT

A method for the thermal utilization of combustible components of waste materials of different properties and origin, independently of the degree of contamination with heavy metals and toxic organic compounds or organic chlorine-containing compounds. The waste materials are subjected to the method steps of pyrolysis, comminution, classification, gasification and gas purification in order to produce a clean gas which can be used for various purposes and as a source of energy and an elution-proof, mineral, solid residue which can be easily disposed of.

17 Claims, 2 Drawing Sheets

METHOD OF THERMAL UTILIZATION OF WASTE MATERIALS

This is a continuation of application Ser. No. 07/983,980, filed Nov. 30, 1992 now abandoned.

BACKGROUND OF THE INVENTION

1. Field of the Invention

The present invention relates to a method of thermal utilization of waste materials of different properties and origin which contain combustible or organic components, independently of the degree of contamination with heavy metals and toxic organic compounds or chlorine-containing organic compounds, while producing a clean gas which has many uses to synthesize other products and for obtaining energy, and elution-proof pure mineral residues. The method is particularly suitable for an environmentally sound utilization of waste materials, such as, domestic garbage, plastic-containing industrial wastes, paint residues, light materials obtained by shredding old automobiles, or wastes contaminated with oils.

2. Description of the Related Art

It is known in the art to burn waste materials which contain combustible components, such as, garbage, in order to utilize the energy content for producing electrical energy and for heating, to destroy toxic organic components and to reduce drastically the volume of the material to be disposed.

Incineration plants for such waste materials require a very complicated flue or smoke gas purification, especially because there is the danger that highly toxic chlorine-containing organic substances, such as, dioxins and furanes, are formed from the chlorine compounds in the material used during the combustion or in the cooling phase of the primary combustion gases. The solid residues (ash) produced during the combustion and flue dusts have a large volume, are sensitive to elution of heavy metals by atmospheric water and are difficult to dispose of. For this reason, a subsequent melting of the ash was proposed in order to convert the ash into a glass-like elution-proof slag; of course, this process is also very expensive.

In addition, it is known in the art to subject waste materials and residues to a gasification. A gasification process which can be used for this purpose is the partial oxidation with oxygen in the flow path. In this process, the fuel, residue or waste material is converted with the oxygen in the form of a flame reaction, usually also under increased pressure, into a gas which is rich in carbon monoxide and hydrogen. The process takes place at temperatures at which the mineral components already primarily form a molten slag which solidifies into a glass-like granulated slag when it is cooled and when it comes into contact with a water bath. A significant portion of the heavy metal content of the waste materials used is bound in the elution-proof granulated slag. Under the conditions of the gasification, chlorine-containing organic compounds primarily contained in the material being used are completely converted, wherein the chlorine content is converted to hydrogen chloride or non-toxic inorganic chlorides. Under these conditions, a de-novo synthesis is excluded. Consequently, the gas being produced is also free of dioxins and furanes. After mechanical purification and cooling of the sulfur content which has been practically completely converted into hydrogen sulfite, the produced gas can be used for energy purposes, for operating gas turbines and gas engines, and as synthesis gas.

The gasification in the flow path has the disadvantage that the material being used for the gasification process must be present in a flowable form, so that the material can be fed into the gasification reactor in a continuous and controlled manner. Flowable materials are gaseous and liquid materials, pumpable suspensions of finely comminuted solid materials in liquids, but also dust-like solid particles suspended in a carrier gas. However, the waste materials to be disposed of frequently have such a consistency and size that the conversion into a flowable form by mechanical processing, particularly by grinding, is technically not possible or cannot be achieved economically.

It has been proposed and tested to subject waste materials of different types to pyrolysis, i.e., a thermal conversion at temperatures of 500° to 700° C. Cylindrical rotary furnaces with external heating are usually used for the pyrolysis. Such furnaces have the advantage that piece-like material as well as finely particulate and flowable materials can be received. The pyrolysis produces a carbon-containing residue, a hydrocarbon-containing weak gas and tar oils which can be condensated. It has been found that the tar oils cannot be processed or are very difficult to process into fuels, heating oil or other products which can be used to synthesize other products. For the weak gas itself or for the flue gas produced during its combustion, substantial purification units are required which are similar to the units used for the flue gas purification of garbage incinerating plants. The solid residues, particularly the carbon-rich fine fractions, are difficult to dispose of, particularly because of their inflammability.

Experience in combustion technology has shown that substances contained in the material or substances newly created during the combustion as well as volatile heavy metals vaporize, are sublimated at the subsequent heating surfaces and form projections together with slag droplets suspended in the flue gas and incompletely burned coke particles, which projections cause interruptions in the operation and the continuous removal thereof also requires high investment and operating costs, and may impair the efficiency.

Moreover, as is the case in a garbage incinerating plant, it remains necessary to carry out a very substantial flue gas purification in order to limit the emission of sulfur dioxide, hydrogen chloride, nitrogen oxides and volatile heavy metals. As our own examinations have shown, even though the flue dusts separated from the flue gas are returned, it is not possible to bind volatile heavy metals, such as, cadmium, zinc, mercury or lead, in a leach-proof manner in the vitrified slag.

Therefore, it is the primary object of the present invention to provide an environmentally sound method for the thermal utilization of waste materials, wherein the method is a combination of known method steps, such as, pyrolysis, comminution, classification, gasification and gas purification. The method should make it possible to utilize piece-like, finely particulate, paste-like and liquid waste materials of different origins, which contain at least portions of combustible or organic materials and cannot be directly reused, independently of the degree of contamination with harmful materials, such as, heavy metals or toxic organic and chlorine-containing organic compounds, while producing a clean gas which can be used for synthesize other products and as an energy source and elution-proof, purely mineral solid residues which can be further utilized or simply disposed of, wherein the disposal of toxic materials in the environment, particularly also polychlorinated dibenzo dioxins and furanes, is excluded. This combination of method steps is to make possible without significant pretreatment the utilization of waste materials, such as, domestic garbage, plastic-containing industrial wastes, paint residues, old tires, light material of shredded automobiles or wastes contaminated with oils.

In accordance with the present invention, the waste materials are subjected to a carbonization or distilling process in a pyrolysis furnace with the exclusion of air at temperatures of up to approximately 800° C., wherein a pyrolysis gas containing vaporized hydrocarbons and a solid pyrolysis residue are produced in the pyrolysis furnace. The pyrolysis gas is separated from the solid pyrolysis residues at temperatures above the condensation temperature of the vaporized hydrocarbons. The solid pyrolysis residues are subjected to a separation process including comminuting and classifying stages, in which a fine material is obtained which is enriched with coke-like components and a coarse material is obtained which is free of organic impurities and is composed essentially of metal components. The separated crude pyrolysis gas, the fine material and optionally an additional fluid fuel are supplied to a gasification reactor in which they are autothermally converted with a gasification agent containing free oxygen into a CO-containing and $H_2$-containing gas and a mineral residue, wherein the ratio of the amount of free oxygen to the amount of carbon contained in the pyrolysis gas, in the fine material and, if applicable in the additional fluid fuel, is selected in such a way that the temperatures occurring in the gasification reactor are above the melting temperature of the mineral residue and a molten slag is produced.

The present invention provides the advantage that piece-like, finely particulate, paste-like and liquid waste materials of different origins, which contain at least portions of combustible or organic materials and cannot be directly reused, can be utilized independently of the degree of the contamination with harmful materials, such as, heavy metals or toxic organic compounds and organic chlorine-containing compounds, while producing a clean gas which can be used for various purposes to synthesize other products and as an energy source and elution-proof, purely mineral solid residues which can be further utilized or simply disposed of without causing a toxic contamination, for example, by polychlorinated dibenzo dioxins and furanes. The combination of the above-described method steps, namely, pyrolysis, comminution, classification, gasification and gas purification, makes it possible without extensive pretreatment to process waste materials, such as, domestic garbage, plastic-containing industrial wastes, paint residues, old tires, light material of shredded automobiles or wastes contaminated with oil. For this purpose, the waste materials are subjected in a pyrolysis furnace to a carbonization process under the exclusion of air at temperatures of up to approximately 800° C., wherein a pyrolysis gas containing vaporized hydrocarbons and a solid pyrolysis residue are produced.

An externally heated cylindrical rotary furnace may serve as the pyrolysis furnace in which the carbonization process takes place. The pyrolysis gas is separated from the solid pyrolysis residues at temperatures above the condensation temperature of the vaporized entrained hydrocarbons. The solid pyrolysis residue is subjected to a separation process which includes comminution and classification stages. The separation process produces a fine material enriched with coke-like components and a coarse material which is free of organic impurities and consists essentially of metal components.

The separated raw pyrolysis gas, the fine material mentioned above and optionally an additional fluid fuel, are fed to a gasification reactor in which they are autothermally converted with a gasification agent containing free oxygen to a gas containing CO and $H_2$ and a mineral residue, wherein the ratio of the quantity of free oxygen relative to the quantity of carbon contained in the pyrolysis gas, and the fine material and, if applicable, the additional fluid fuel, is selected such that the resulting temperatures in the gasification reactor are greater than the melting temperature of the mineral residue and a molten slag is produced.

The molten slag is cooled, is granulated by contacting it with water and is removed from the gasification reactor.

The gas enriched with CO and $H_2$ is cooled and sulfur compounds, hydrogen halides and aerosols are removed therefrom.

The conversion in the flow path of the gasification agent containing free oxygen takes place in the form of a flame reaction.

The fine material which is obtained in the separation process, for example, by means of screen sizing, is ground to a grain size of less than 1 millimeters, preferably less than 0.5 millimeters.

A ball mill may be used for grinding. The ground fine material is fed suspended in a carrier gas to the gasification reactor. A combustible gas serving as additional fuel may be used as the carrier.

Another possibility is to feed the fine material suspended in a carrier liquid to the gasification reactor.

The carrier liquid may be a combustible liquid which may serve as additional fuel. In this manner, it is possible to compensate for variations in the fuel content of the waste materials.

Moreover, it has been found advantageous to cool the pyrolysis gas after the separation from the solid pyrolysis residues, so that at least a portion of the vaporized entrained hydrocarbons are condensated and separated from the pyrolysis gas.

At least a portion of the hydrocarbons condensated from the pyrolysis gas can be supplied as an additional fluid fuel to the gasification reactor. Combustible waste materials from the group of pulverized solid waste materials suspended in a carrier gas, pulverized solid waste materials suspended in a carrier gas liquid, liquid waste materials and contaminated combustible gases may be fed to the gasification reactor as additional fluid fuel.

A portion of the flow of the CO-enriched and $H_2$-enriched gases which have been freed of sulfur compounds, hydrogen halides and aerosols may be utilized for externally heating the pyrolysis furnace.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DESCRIPTION OF THE PREFERRED EMBODIMENTS

Figure 1:
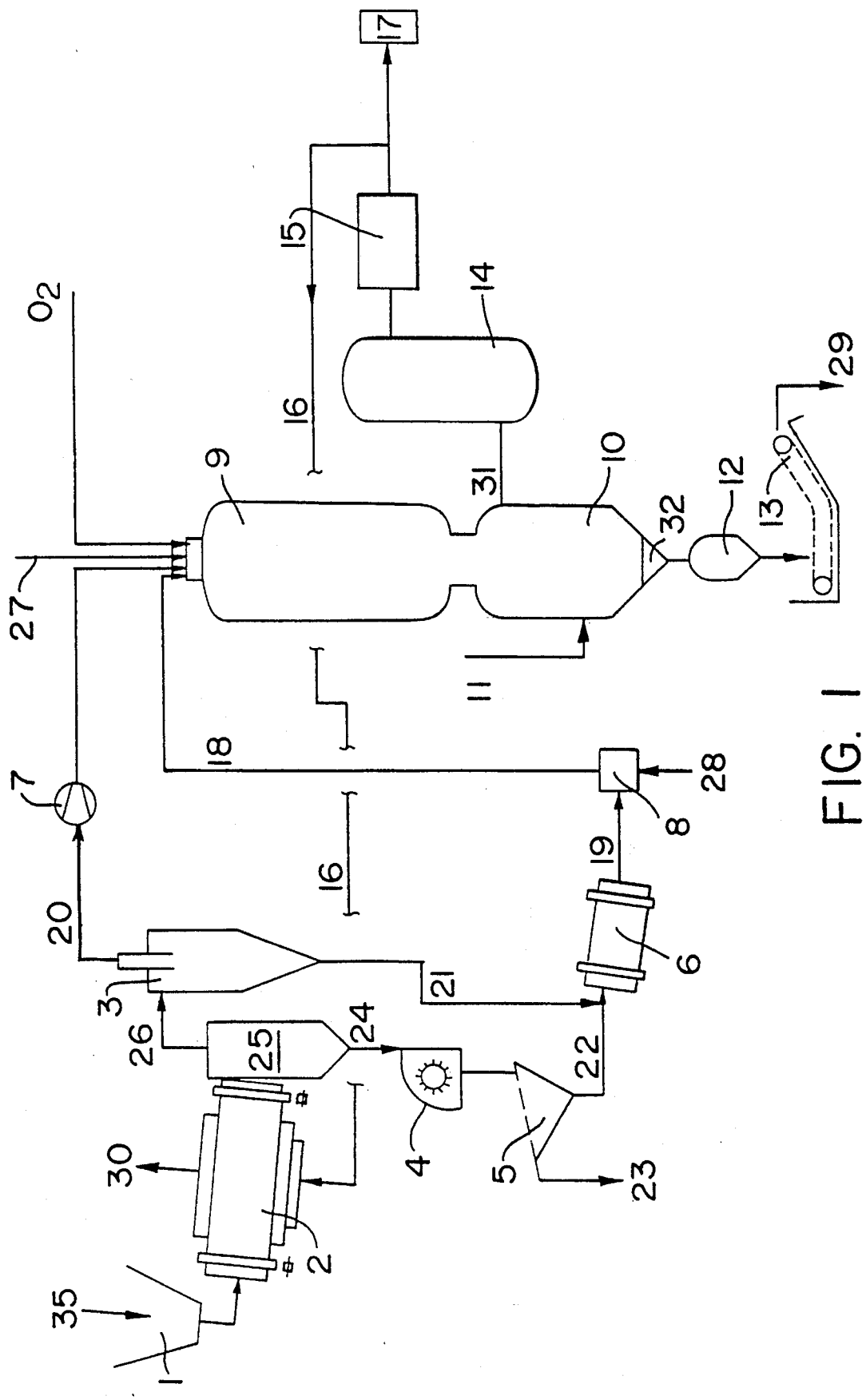
FIG. 1 is a schematic diagram showing the steps for carrying out the method according to the invention for utilizing domestic garbage.

Garbage 35 which has been delivered is subjected to a precomminution step, not shown in the diagram, and is fed through a silo 1 to a pyrolysis furnace in the form of a cylindrical rotary furnace 2 which is heated externally by means of purified gas 16 produced in the system, and is subjected to a carbonization process with a final temperature of approximately 650° C.

By using conventional input and output locking devices, it is ensured that the carbonization process takes place practically with the exclusion of air. Under these conditions, the organic contents of the garbage are converted into a coke-like pyrolysis residue 24 while splitting off a crude pyrolysis gas 26 which contains vaporized hydrocarbons. Together with the essentially unchanged inorganic components of the garbage, the pyrolysis residue 24 is fed through a conventional discharge housing 25 with a gas-tight discharge lock from the cylindrical rotary furnace 2 and is supplied to a crusher 4. The crude pyrolysis gas 26 is conducted out of the discharge housing 25 toward the top and is freed of entrained solid particles in the dust separator 3 without being substantially cooled.

The material discharged from the crusher 4 passes the screen 5 equipped with a screen mesh of approximately 15 millimeters mesh width. The screen 5 serves to obtain a fine material 22 which is enriched with coke-like components and a coarse material 23 which is free of organic impurities and consists essentially of metal components. Together with the dust 21 obtained from the pyrolysis gas 26 by means of the dust separator 3, the fine material 22 is ground in a tube mill 6 to a grain size of less than approximately 0.5 millimeters.

By means of a pneumatic conveyor 8, the ground fine material 19 is conveyed as a fluid flow 18 with nitrogen as carrier gas 28 to a gasification reactor 9 which operates in accordance with the suspended flow principle. By means of a hot gas compressor 7, the crude pyrolysis gas 20 which has been freed from solid residues is introduced into the gasification reactor 9, wherein the pyrolysis gas 20 is maintained during the compression and the conveyance at a temperature at which a condensation of hydrocarbons and water vapor is prevented. It has been found that a temperature of at least 300° C. is sufficient for this purpose.

The gasification reactor 9 includes an outer pressure vessel in which is arranged a cylindrical reaction chamber which is designed for high temperature operation and is connected at the bottom thereof to a quenching chamber 10. An advantageous construction of the reaction chamber has been found to be a tubular wall construction which is welded in a gas-tight manner and is cooled by pressurized water and has a refractory layer placed on the side of the reaction chamber. Supplied into the reaction chamber through a burner at the head of the reactor 9 are the ground pyrolysis coke in the fluid flow 18, the crude pyrolysis gas 20, technical oxygen $O_2$ as gasification agent and natural gas as additional fuel 27 for maintaining a supporting flame. The conversion to a CO-containing and $H_2$-containing gas takes place in the form of a flame reaction, wherein the ratio of oxygen $O_2$ to the hydrocarbons or carbon contained in the crude pyrolysis gas 20, in the pyrolysis coke 19 and in the additional fuel is selected such that the temperature obtained at the end of the reaction chamber is greater than the melting temperature of the mineral residues and a molten slag is produced.

A temperature of approximately 1400° C. is usually sufficient. For this purpose, a quantity of oxygen $O_2$ is required which constitutes approximately 45% of the oxygen quantity necessary for the stoichiometrical combustion of the combustible components introduced into the reaction chamber.

The gas produced in the reaction chamber essentially consists of CO and $H_2$ as effective components, and further of $CO_2$ and water steam. $NH_3$, $H_2S$ and HCl are trace components. The gas is free of hydrocarbons and organic chlorine-containing compounds, such as, dioxins. The gas is introduced together with the molten slag into the quenching chamber 10 where it is brought into contact with quenching water supplied through a line 11. As a result, the gas is cooled to saturation temperature and is simultaneously saturated with water steam and is freed of residual dust, HCl and $NH_3$. The molten slag solidifies and is collected in the sump 32 of the quenching chamber 10. Because of the contact with water, the slag disintegrates into a granulate 29 having glass-like structure which is discharged through the slag lock 12 and the slag discharge 13 consisting of a water-filled collection basin with a scraper conveyor.

The saturated gasification gas 31 is cooled in a gas cooler 14 while obtaining waste heat and is freed of $H_2S$ and $NH_3$ in the gas purification step 15 by means of conventional methods. Finally, the $H_2S$ fraction is processed into sulfur which can be commercially sold.

To the extent that it is not utilized for heating the cylindrical rotary furnace 2, the remaining purified gas 16 is used for operating a gas engine 17. The flue gas 30 produced by heating the furnace 2 from below is conducted away.

The condensate produced during cooling is returned as quenching water 11 into the quenching chamber 10. The rest of the water which remains non-vaporized in the quenching chamber 10 is taken out of the circulation. This water contains the chlorine contained in the initial material in the form of chloride ions, but is free of organic impurities. The water is processed by conventional methods, i.e. vaporization.

A throughput of 20 t/h domestic garbage 35 having a composition of approximately

| | |
|---|---|
| water content | 20% |
| ash content | 41.6% (water-free) |
| carbon | 33.1% |
| hydrogen | 3.8% |
| oxygen | 20.2% |
| nitrogen | 0.7% |
| sulfur | 0.1% |
| chlorine | 0.5% |
| heating value | 13.1 MJ/kg | produces 5,200 $m^3_N$/h dry pyrolysis gas 26 having a content of condensable hydrocarbons of approximately 180 $g/m^3$ and a heating value (including hydrocarbon vapors) of 18.0 $MJ/m^3_N$ and 6,000 $m^3_N$/h water vapor.

In addition, 9,500 kg/h of solid residues 24 are obtained in the distribution of 2,800 kg/h of coarse fraction 23 and 7,300 kg/h of fine fraction which is rich in carbon. While the elution-proof, coarse fraction 23 which is composed practically exclusively of mineral and metal components is further processed and utilized or disposed of, the ground fine material 19 with an ash content of approximately 53%, as well as the pyrolysis gas 26 containing water vapor and hydrocarbon vapors, are supplied to the gasification reactor 9 after the separation process in the separator 3.

The gasification takes place at a pressure of 2 bar with the conversion of 5,850 $m^3_N$/h Of technical oxygen. This takes into consideration that 600 $m^3_N$/h of natural gas are used as additional fuel 27.

The process results in 19,600 m³$_N$/h of gasification gas 31 having a composition of

| 37% | H₂ |
|---|---|
| 39% | CO |
| 20% | CO₂ |
| 4% | N₂ | and a heat value of 8.9 MJ/m³$_N$. The gas contains 4 g/m³$_N$ of chlorine in the form of hydrogen chloride and vaporized chloride salts (NaCl, KCl) which are picked up by the wash water in the quenching chamber 10 and after vaporization of the process waste water result in approximately 150 kg/h of solid salts. In addition, the gas contains approximately 0.8 g/m³$_N$ of hydrogen sulfide which is separated in the gas purification step and is oxidated into approximately 15 kg/h elementary sulfur. Approximately 25% of the purified gas 16 are returned for heating the cylindrical rotary furnace 2.

The purified gas contains approximately 5 mg/m³$_N$ sulfur. After combustion or use of the purified gas 16 in the gas engine 17, this corresponds to a SO₂ content in the waste gases of approximately 2.5 mg SO₂/m³$_N$ and meets all requirements of environmental protection.

Also produced are 3,600 kg/h of glass-like granulated material 29 which can be harmlessly disposed of after elution tests have been carried out.

Figure 2:
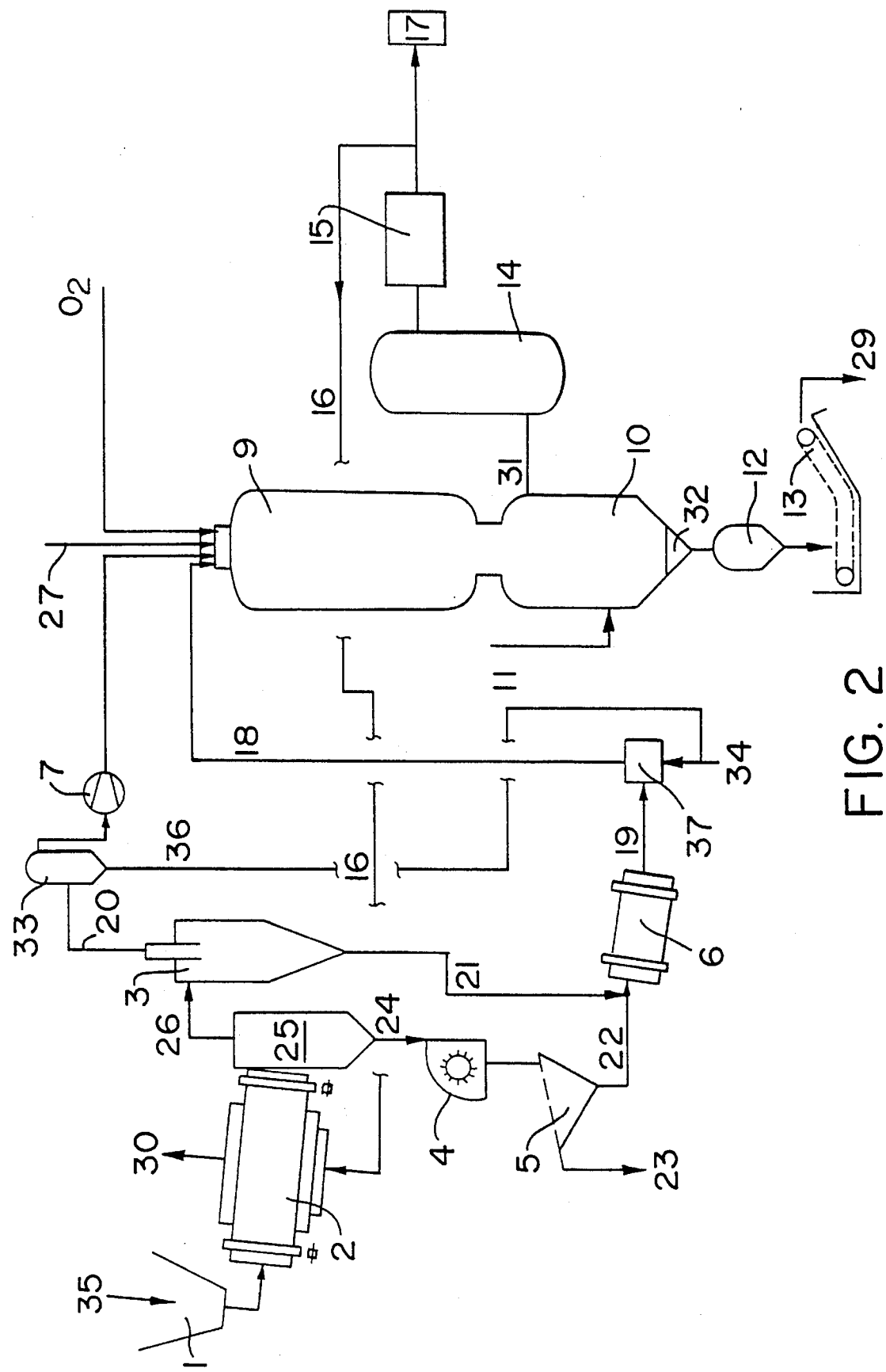
FIG. 2 is a schematic diagram showing the method steps of FIG. 1 with additional feeding of fluid waste materials to the gas reactor.

In a second embodiment of the present invention shown in FIG. 2, the waste materials 35 to be processed are approximately 10 t/h of garbage enriched with plastic wastes and additionally 3 t/h of waste oils which contain heavy metals and chlorine. In this embodiment, the gasification reactor 9 is operated at a pressure of 6 bar.

The method of the second embodiment differs from the first embodiment in that the hot crude gas 20 emerging from the dust separator 3 is cooled to approximately 90° C. before it is taken in by the hot gas compressor 7. The cooling step can be effected in an additionally provided gas cooler 33. As a result, approximately 900 kg/h of tar and oil 36 are condensated which are added to the waste oil 34. On the other hand, during cooling, the process does not fall below the water vapor dew point of approximately 80° C.

The conveyor 8 which in the first embodiment is a pneumatic sealed flow conveyor system and operates with a carrier gas 28, is replaced by a hydraulic conveyor system 37. The ground fine grain portion of the pyrolysis coke 19 is mixed with the waste oil and the tar and oils from the pyrolysis and is fed by means of a pump to the burner of the gasification reactor 9. The carbon dust and oil sludge fed into the reactor has a solid content of approximately 50%.

When 5,700 m³$_N$/h of technical oxygen 0₂ are utilized, 18,500 m³$_N$/h of gas 31 having approximately the same composition as in the first example are produced.

It has been found that the quantities of chlorine introduced with the waste oil are also quantitatively converted to hydrogen chloride or chloride salts and are discharged with the pyrolysis waste water. The use of waste oil has no perceptible influence on the properties of the glass-like granulated slag 29. Moreover, it has been found that under these conditions the waste oil is gasified practically without the formation of soot and the waste water remains free of organic impurities.

It should be understood that the preferred embodiments and examples described are for illustrative purposes only and are not to be construed as limiting the scope of the present invention which is properly delineated only in the appended claims.

What is claimed is:

1. A method of thermal utilization of waste materials of any consistency containing combustible or organic components, the method comprising the steps of:
    (a) feeding the waste materials containing at least a portion of a coarse, noncomminutable material into an externally heated cylindrical rotary pyrolysis furnace;
    (b) subjecting the waste materials to a carbonization process in the cylindrical rotary pyrolysis furnace with the exclusion of air at temperatures of up to approximately 800° C. for producing a solid pyrolysis residue and a pyrolysis gas containing vaporized hydrocarbons;
    separating the pyrolysis gas from the solid pyrolysis residue at temperatures above the condensation temperature of the vaporized hydrocarbons;
    (d) subjecting the solid pyrolysis residue to a separation process including comminuting and classifying states, wherein a fine material is obtained which is enriched with coke-like compounds and a coarse material is obtained which is free of organic impurities and is composed essentially of metal components;
    (e) feeding the pyrolysis gas and the fine material to an entrained flow gasification reactor;
    (f) converting the pyrolysis gas and the fine material in the gasification reactor with a gasification agent containing free oxygen autothermally in a flame reaction at a temperature of 1400° C. and above the melting temperature of the mineral residues into gas containing CO and H₂ and free of hydrocarbons and a mineral residue in the form of a molten slag; and
    (g) using a portion of the gas generated in the gasification reactor for externally heating the cylindrical rotary pyrolysis furnace, wherein the temperatures occurring in the gasification reactor are regulated by varying the quantity of free oxygen to the quantity of carbon in the pyrolysis gas and in the fine material.

2. The method according to claim 1, comprising additionally feeding fluid fuel to the gasification reactor.

3. The method according to claim 2, wherein the additional fluid fuel are combustible waste materials selected from the group consisting of pulverized solid waste materials suspended in a carrier gas, pulverized solid waste materials suspended in a carrier liquid, liquid waste materials and contaminated combustible gases.

4. The method according to claim 1, comprising cooling the molten slag, granulating the slag by contacting the slag with water and discharging the slag from the gasification reactor.

5. The method according to claim 1, comprising cooling the gas enriched with CO and H₂ and removing sulfur compounds, hydrogen halides and aerosols therefrom.

6. The method according to claim 1, comprising grinding the fine material to a grain size of less than 1 millimeter.

7. The method according to claim 6, comprising grinding the fine material to a grain size of less than 0.5 millimeters.

8. The method according to claim 6, comprising feeding the ground fine material suspended in a carrier gas to the gasification reactor.

9. The method according to claim 8, comprising utilizing combustible gas serving as additional fuel as the carrier gas.

10. The method according to claim 1, comprising feeding the fine material suspended in a carrier liquid to the gasification reactor.

11. The method according to claim 10, comprising utilizing a liquid serving as additional fuel as the carrier liquid.

12. The method according to claim 1, comprising cooling the pyrolysis gas after the separation from the solid pyrolysis residue, and condensing and separating from the pyrolysis gas at least a portion of the vaporized hydrocarbons.

13. The method according to claim 12, comprising feeding at least a portion of the hydrocarbons condensed from the pyrolysis gas as an additional fluid fuel to the gasification reactor.

14. The method according to claim 1, including externally heating the furnace using CO-enriched and $H_2$-enriched gas which has been freed from sulphur compounds, hydrogen halides and aerosols.

15. A method as defined in claim 1, wherein said step of subjecting the waste materials to a carbonization process includes subjecting at least one of domestic garbage, plastic-containing industrial waste, paint residue, tires, light material of shredded automobiles, and oil contaminated waste to the carbonization process.

16. A method as defined in claim 1, wherein the step of using a portion of the generated gas for externally heating the rotary furnace includes using 25% of the gas for heating the rotary furnace, a remaining portion of the gas being usable for other external uses.

17. A method of thermal utilization of waste materials of any consistency containing combustible or organic components, the method consisting essentially of the steps of:

(a) feeding the waste materials containing at least a portion of a coarse, noncomminutable material into an externally heated cylindrical rotary pyrolysis furnace;

(b) subjecting the waste materials to a carbonization process in the cylindrical rotary pyrolysis furnace with the exclusion of air by indirectly heating the waste material to a temperature of up to approximately 800° C for producing a solid pyrolysis residue and a pyrolysis gas containing vaporized hydrocarbons;

(c) separating the pyrolysis gas from the solid pyrolysis residue at temperatures above the condensation temperature of the vaporized hydrocarbons;

(d) subjecting the solid pyrolysis residue to a separation process including comminuting and classifying stages, wherein a fine material is obtained which is enriched with coke-like compounds and a coarse material is obtained which is free of organic impurities and is composed essentially of metal components;

(e) feeding the pyrolysis gas and the fine material from step (d) to an entrained flow gasification reactor;

(f) converting the pyrolysis gas and the fine material in the gasification reactor with a gasification agent containing free oxygen autothermally in a flame reaction at a temperature of approximately 1400° C. and above the melting temperature of the mineral residues by adjusting the ratio of the amount of free oxygen to the amount of carbon contained in the pyrolysis gas and the fine material to obtain a gas containing CO and $H_2$ and free of hydrocarbons and a mineral residue in form of a molten slag;

(g) cooling the molten slag, granulating the slag by contacting the slag with water and discharging the slag from the gasification reactor; and (h) cooling the gas enriched with CO and $H_2$ and removing sulfur compounds, hydrogen halides and aerosols therefrom.

* * * * *